US012671797B2

(12) United States Patent
Lin et al.

(10) Patent No.: US 12,671,797 B2
(45) Date of Patent: Jun. 30, 2026

(54) STEREOSCOPIC IMAGING DEVICE

(71) Applicant: Industrial Technology Research Institute, Hsinchu (TW)

(72) Inventors: Chia-Ping Lin, Hsinchu City (TW);
Yu-Hsiang Liu, Chiayi City (TW);
Yi-Hsiang Huang, Changhua County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 19/079,360

(22) Filed: Mar. 13, 2025

(65) Prior Publication Data

US 2026/0181123 A1     Jun. 25, 2026

(30) Foreign Application Priority Data

Dec. 25, 2024     (TW) ................................. 113150566

(51) Int. Cl.
*H04N 13/254*          (2018.01)
*G03B 7/10*            (2021.01)
*H04N 13/296*          (2018.01)

(52) U.S. Cl.
CPC ............. *H04N 13/296* (2018.05); *G03B 7/10* (2013.01); *H04N 13/254* (2018.05)

(58) Field of Classification Search
CPC ....... H04N 13/296; H04N 13/254; G03B 7/10
USPC ......................................................... 348/46
See application file for complete search history.

(56) References Cited

U.S. PATENT DOCUMENTS

| | | | | |
|---|---|---|---|---|
| 6,061,179 A | | 5/2000 | Inoguchi et al. | |
| 2012/0319222 A1* | | 12/2012 | Ozawa ................ | H10F 39/8067 257/E31.127 |
| 2013/0083172 A1* | | 4/2013 | Baba .................... | H04N 13/289 348/49 |

FOREIGN PATENT DOCUMENTS

| | | |
|---|---|---|
| CN | 1299564 | 6/2001 |
| EP | 2487917 | 8/2012 |
| JP | 2005165032 | 6/2005 |
| TW | 201215916 | 4/2012 |
| TW | I458530 | 11/2014 |
| TW | I577922 | 4/2017 |
| TW | 202001323 | 1/2020 |

OTHER PUBLICATIONS

"Office Action of Taiwan Counterpart Application", issued on Sep. 16, 2025, p. 1-p. 8.

* cited by examiner

*Primary Examiner* — Nguyen T Truong
(74) *Attorney, Agent, or Firm* — JCIPRNET

(57)          ABSTRACT

Provided is a stereoscopic imaging device including a light source, a control mechanism, and a light-transmitting plate. The light-transmitting plate is coupled to the control mechanism and positioned at one side of the light source. The light-transmitting plate includes a first pattern area and a second pattern area, and the control mechanism is configured to control displacement of the light-transmitting plate, allowing the plate to either receive light from the light source via the first pattern area or switch to receiving light through the second pattern area, thereby displaying different stereoscopic images.

14 Claims, 11 Drawing Sheets

STEREOSCOPIC IMAGING DEVICE

CROSS-REFERENCE TO RELATED APPLICATION

This application claims the priority benefit of Taiwan application serial no. 113150566, filed on Dec. 25, 2024. The entirety of the above-mentioned patent application is hereby incorporated by reference herein.

BACKGROUND

Technical Field

This disclosure relates to an imaging device, and particularly relates to a stereoscopic imaging device.

Related Art

Parallax barriers and lenticular lenses are common naked-eye stereoscopic imaging technologies. Although they can generate different stereoscopic images or dynamic stereoscopic images through, for example, liquid crystal displays, they have the problem of poor resolution. In addition, although high-resolution floating stereoscopic images can be generated by projecting light from a light source onto a high-resolution imaging plate, only a single image corresponding to the image data of the imaging plate can be generated.

SUMMARY

A stereoscopic imaging device of an embodiment of the disclosure includes a light source, a control mechanism, and a light-transmitting plate. The light-transmitting plate is coupled to the control mechanism and disposed at one side of the light source. The light-transmitting plate includes a first pattern area and a second pattern area, and the control mechanism is configured to control the light-transmitting plate to generate displacement, thereby receiving light from the light source through the first pattern area or converting to receive light from the light source through the second pattern area, thus displaying different stereoscopic images.

A stereoscopic imaging device of another embodiment of the disclosure includes a light source, a control mechanism, a light-transmitting plate, and a light shield. The light-transmitting plate is disposed at one side of the light source. The light-transmitting plate includes a first pattern area and a second pattern area, and the light shield is disposed between the light source and the light-transmitting plate. The light-transmitting plate or the light shield is coupled to the control mechanism and is suitable for generating displacement under control of the control mechanism, to receive light from the light source through the first pattern area and block the second pattern area by the light shield, or convert to receive the light from the light source through the second pattern area and block the first pattern area by the light shield, thereby displaying different three-dimensional images.

Several exemplary embodiments accompanied with figures are described below to further describe the disclosure in details.

BRIEF DESCRIPTION OF THE DRAWINGS

The accompanying drawings are included to provide a further understanding, and are incorporated in and constitute a part of this specification. The drawings illustrate exemplary embodiments and, together with the description, serve to explain the principles of the disclosure.

DESCRIPTION OF THE EMBODIMENTS

Figure 1:
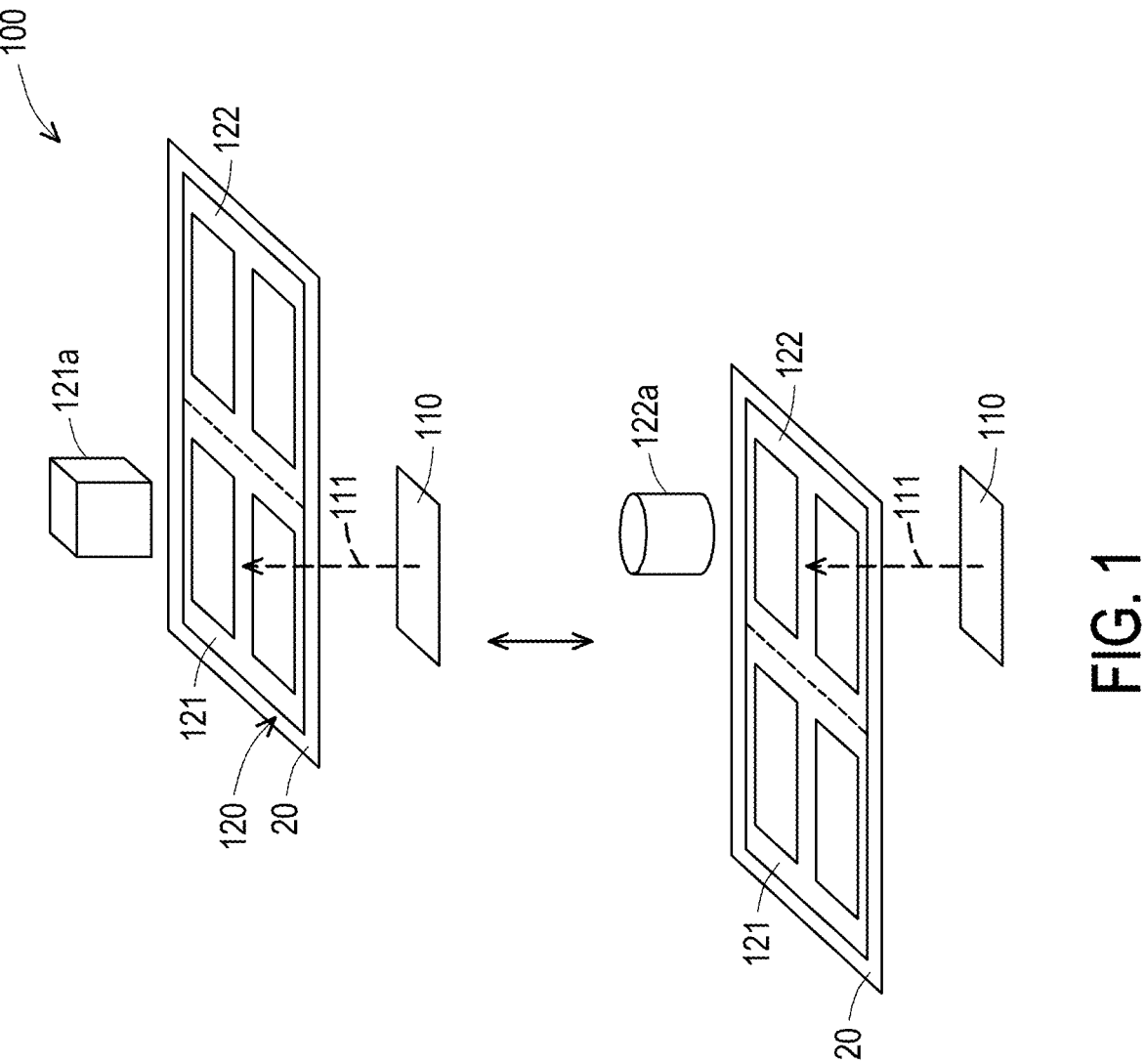
FIG. 1 is a schematic diagram illustrating image conversion of a stereoscopic imaging device according to an embodiment of the disclosure.

FIG. 1 is a schematic diagram illustrating image conversion of a stereoscopic imaging device according to an embodiment of the disclosure. Referring to FIG. 1, in this embodiment, a stereoscopic imaging device 100 includes a light source 110, a light-transmitting plate 120, and a control mechanism 20. The light-transmitting plate 120 is disposed at one side of the light source 110 and is positioned in the light path of light 111 emitted by the light source 110. The light-transmitting plate 120, for example, is an imaging plate, and at least includes a first pattern area 121 and a second pattern area 122 arranged linearly.

For example, the first pattern area 121 has image data corresponding to a first floating stereoscopic image 121a, and the second pattern area 122 has image data corresponding to a second floating stereoscopic image 122a. On the other hand, the image data may be formed on the light-transmitting plate 120 through printing, microlithography techniques, or other applicable methods, that is, recording the light field information (for example, spatial position coordinates, direction angles, and intensity magnitudes, etc.) of the object to be imaged on the light-transmitting plate 120. Furthermore, the floating stereoscopic image of the object to be imaged cannot be directly seen with the naked eye through the light-transmitting plate 120. By combining with a light source to reconstruct the light field information recorded on the light-transmitting plate 120, restore the reflection light characteristics and directions entering the eyes of the viewer, in order to see the floating stereoscopic image, allowing the viewer to generate the same visual effect as observing a real object when viewing the reconstructed floating stereoscopic image from various angles.

The light-transmitting plate 120 is coupled to the control mechanism 20, so that the control mechanism 20 controls the light-transmitting plate 120 to generate linear displacement relative to the light source 110, for example, sliding along the horizontal direction. When the first pattern area 121 is aligned with the light source 110, the second pattern area 122 is misaligned with the light source 110, thereby allowing the first pattern area 121 to receive the light 111 from the light source 110, thus displaying a high-resolution first floating stereoscopic image 121a above or at one side of the light-transmitting plate 120. When the control mechanism 20 controls the light-transmitting plate 120 to move and align the second pattern area 122 with the light source 110, the first pattern area 121 is misaligned with the light source 110, thereby allowing the second pattern area 122 to receive the light 111 from the light source 110, thus displaying a high-resolution second floating stereoscopic image 122a above or at one side of the light-transmitting plate 120. However, to simplify the diagram for better understanding, the floating stereoscopic images in each embodiment are drawn using simplified methods, but in actual applications, more complex patterns that can be paired with the stereoscopic imaging device may be used.

For example, the light-transmitting plate 120 may include two or more pattern areas, and these pattern areas are linearly arranged on the light-transmitting plate 120. When any one of the pattern areas receives the light 111 from the light source 110, the corresponding floating stereoscopic image is displayed above or at one side of the light-transmitting plate 120. In one example, these floating stereoscopic images may be different stereoscopic images, displaying different image content respectively. In another example, these floating stereoscopic images may be similar stereoscopic images, but with different states. Through the linear displacement generated by the light-transmitting plate 120, these stereoscopic images may be continuously converted, thereby realizing the display of dynamic stereoscopic images.

Figure 2:
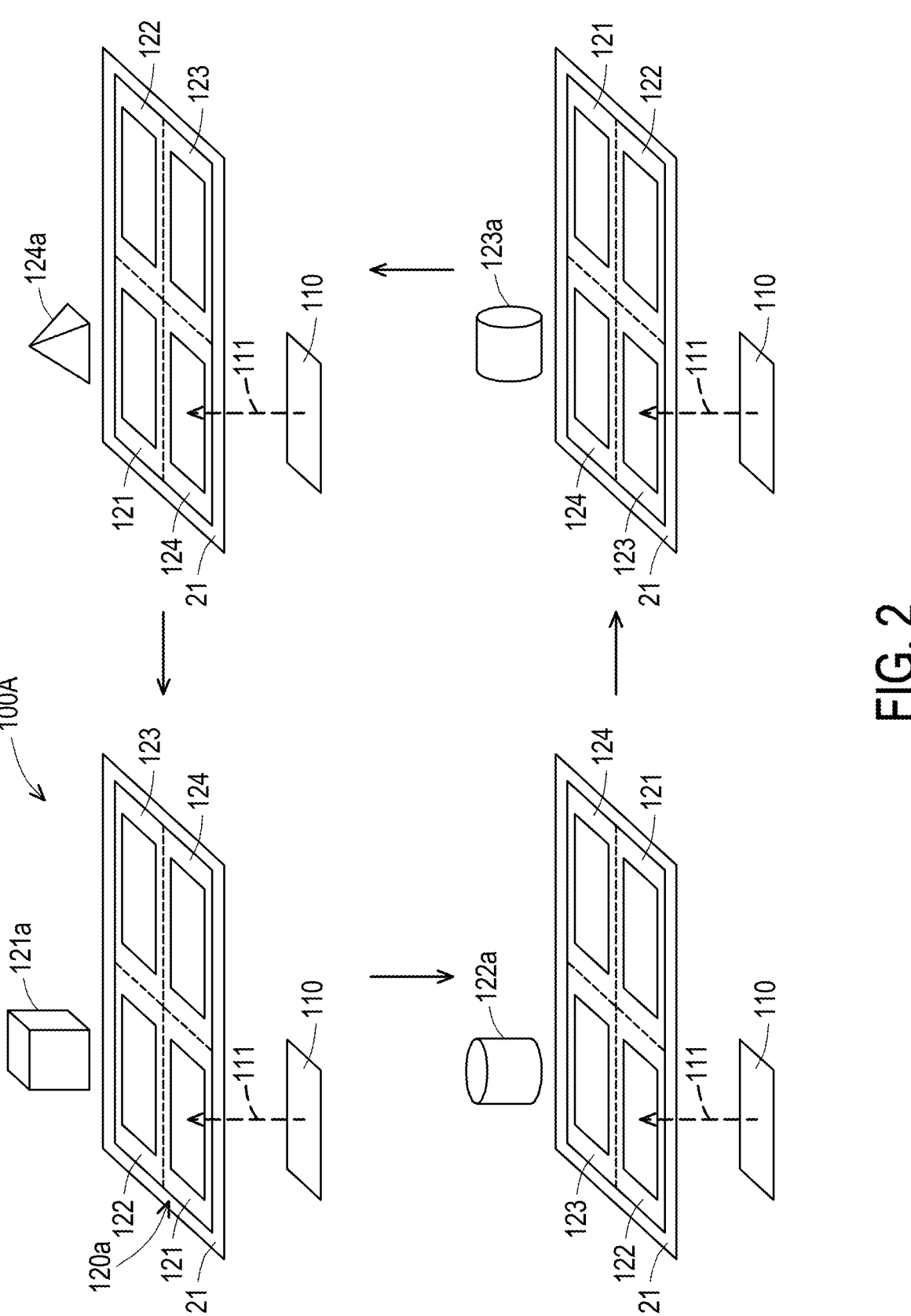
FIG. 2 is a schematic diagram illustrating image conversion of a stereoscopic imaging device according to another embodiment of the disclosure.

FIG. 2 is a schematic diagram illustrating image conversion of a stereoscopic imaging device according to another embodiment of the disclosure. Referring to FIG. 2, in this embodiment, a stereoscopic imaging device 100A includes a light source 110, a light-transmitting plate 120a, and a control mechanism 21. Specifically, the light-transmitting plate 120a is disposed at one side of the light source 110 and is positioned in the light path of light 111 emitted by the light source 110. The light-transmitting plate 120a may be an imaging plate, and at least includes a first pattern area 121, a second pattern area 122, a third pattern area 123, and a fourth pattern area 124.

For example, the first pattern area 121 has image data corresponding to a first floating stereoscopic image 121a, and the second pattern area 122 has image data corresponding to a second floating stereoscopic image 122a. Additionally, the third pattern area 123 has image data corresponding to a third floating stereoscopic image 123a, and the fourth pattern area 124 has image data corresponding to a fourth floating stereoscopic image 124a.

In this embodiment, the first pattern area 121, the second pattern area 122, the third pattern area 123, and the fourth pattern area 124 may be arranged in a matrix on the light-transmitting plate 120a, and the light-transmitting plate 120a is coupled to the control mechanism 21, so that the control mechanism 21 may control the light-transmitting plate 120a to generate rotational displacement relative to the light source 110, for example, rotating around a vertical axis relative to the light source 110. When the first pattern area 121 is aligned with the light source 110, the second pattern area 122, the third pattern area 123, and the fourth pattern area 124 are misaligned with the light source 110, thereby allowing the first pattern area 121 to receive the light 111 from the light source 110, thus displaying the first floating stereoscopic image 121a with high resolution above or at one side of the light-transmitting plate 120a.

When the control mechanism 21 controls the light-transmitting plate 120a to rotate relative to the light source 110 (for example, rotating 90 degrees counterclockwise) and aligns the second pattern area 122 with the light source 110, the first pattern area 121, the third pattern area 123, and the fourth pattern area 124 are misaligned with the light source 110, thereby allowing the second pattern area 122 to receive the light 111 from the light source 110, thus displaying the second floating stereoscopic image 122a with high resolution above or at one side of the light-transmitting plate 120a.

When the control mechanism 21 controls the light-transmitting plate 120a to rotate relative to the light source 110 (for example, rotating 90 degrees counterclockwise) and aligns the third pattern area 123 with the light source 110, the first pattern area 121, the second pattern area 122, and the fourth pattern area 124 are misaligned with the light source 110, thereby allowing the third pattern area 123 to receive the light 111 from the light source 110, thus displaying the third floating stereoscopic image 123a with high resolution above or at one side of the light-transmitting plate 120a.

When the control mechanism 21 controls the light-transmitting plate 120a to rotate relative to the light source 110 (for example, rotating 90 degrees counterclockwise) and aligns the fourth pattern area 124 with the light source 110, the first pattern area 121, the second pattern area 122, and the third pattern area 123 are misaligned with the light source 110, thereby allowing the fourth pattern area 124 to receive the light 111 from the light source 110, thus displaying the fourth floating stereoscopic image 124a with high resolution above or at one side of the light-transmitting plate 120a.

It is particularly noted that the control mechanism 21 may also control the light-transmitting plate 120a to rotate clockwise relative to the light source 110, sequentially displaying the first floating stereoscopic image 121a, the fourth floating stereoscopic image 124a, the third floating stereoscopic image 123a, and the second floating stereoscopic image 122a.

For example, the light-transmitting plate 120a may include four pattern areas arranged in a matrix, more pattern areas arranged in a matrix, or multiple pattern areas arranged in a circular manner. When any one of the pattern areas receives the light 111 from the light source 110, the corresponding floating stereoscopic image is displayed above or at one side of the light-transmitting plate 120a. In one example, these floating stereoscopic images may be different stereoscopic images, each displaying different image content. In another example, these floating stereoscopic images may be similar stereoscopic images but with different states. Through the rotational displacement generated by the light-transmitting plate 120a, these stereoscopic images may be continuously converted, thereby realizing the display of dynamic stereoscopic images.

According to the imaging requirements, the control mechanism 21 may flexibly control the light-transmitting plate 120a to rotate counterclockwise or clockwise, not limited to continuous rotation in a single direction. In addition, the light-transmitting plate 120a may also adopt a horizontal movement mechanism (for example, moving forward, backward, left, and right) to implement image conversion.

Figure 3:
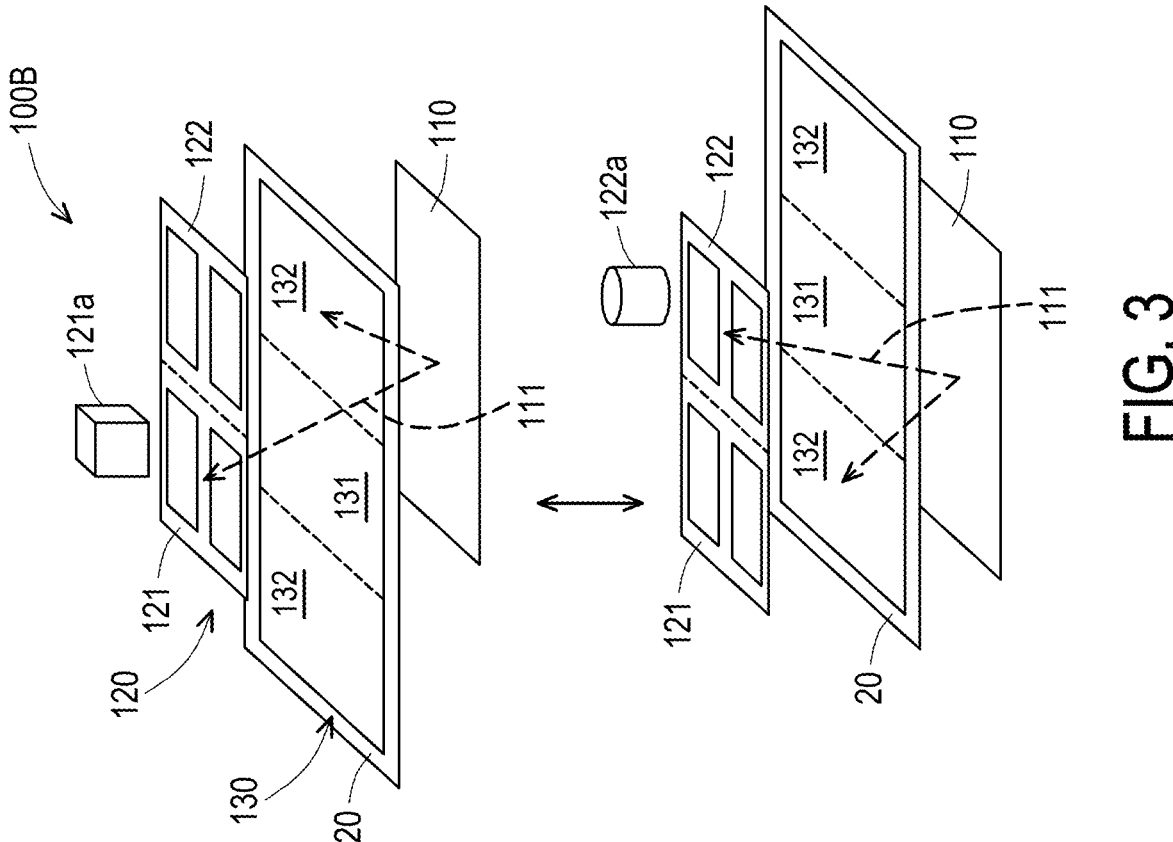
FIG. 3 is a schematic diagram illustrating image conversion of a stereoscopic imaging device according to yet another embodiment of the disclosure.

FIG. 3 is a schematic diagram illustrating image conversion of a stereoscopic imaging device according to yet another embodiment of the disclosure. Referring to FIG. 3, in this embodiment, a stereoscopic imaging device 100B includes a light source 110, a light-transmitting plate 120, a light shield 130, and a control mechanism 20. The light-transmitting plate 120 is disposed at one side of the light source 110 and is positioned in the light path of light 111 emitted by the light source 110. The light-transmitting plate 120 may be an imaging plate and includes at least a first pattern area 121 and a second pattern area 122 arranged linearly.

For example, the first pattern area 121 may have image data corresponding to a first floating stereoscopic image 121*a*, and the second pattern area 122 may have image data corresponding to a second floating stereoscopic image 122*a*.

The light shield 130 is disposed between the light source 110 and the light-transmitting plate 120, and is coupled to the control mechanism 20. Relative displacement may be generated among the light shield 130, the light source 110, and the light-transmitting plate 120. For example, the positions of the light-transmitting plate 120 and the light source 110 may remain stationary, and the control mechanism 20 may control the light shield 130 to generate linear displacement between the light source 110 and the light-transmitting plate 120, such as moving along the horizontal direction. Based on the sliding of the light shield 130 between the light source 110 and the light-transmitting plate 120, in one state, a part of the light 111 may pass through the light shield 130 and project onto the first pattern area 121. And, other parts of the light 111 are blocked by the light shield 130 and cannot project onto the second pattern area 122, i.e., the light shield 130 blocks the second pattern area 122. In another state, a part of the light 111 may pass through the light shield 130 and project onto the second pattern area 122. And, other parts of the light 111 are blocked by the light shield 130 and cannot project onto the first pattern area 121, i.e., the light shield 130 blocks the first pattern area 121.

The light shield 130 may include a light-transmitting area 131 and a light-shading area 132. A part of the light 111 may pass through the light-transmitting area 131 and project towards the light-transmitting plate 120. Additionally, other parts of the light 111 will be blocked by the light-shading area 132 and cannot project towards the light-transmitting plate 120. When the light-transmitting area 131 is aligned with the first pattern area 121, the light-shading area 132 is aligned with the second pattern area 122, thereby allowing the first pattern area 121 to receive the light 111 from the light source 110, and the light shield 130 blocks the second pattern area 122, thus displaying a high-resolution first floating stereoscopic image 121*a* above or at one side of the light-transmitting plate 120.

When the control mechanism 20 controls the light shield 130 to move between the light source 110 and the light-transmitting plate 120 and aligns the light-transmitting area 131 with the second pattern area 122, the light-shading area 132 is aligned with the first pattern area 121, thereby allowing the second pattern area 122 to receive the light 111 from the light source 110, and the light shield 130 blocks the first pattern area 121, thus displaying a high-resolution second floating stereoscopic image 122*a* above or at one side of the light-transmitting plate 120. For example, the light-transmitting plate 120 may include two or more pattern areas, these pattern areas may be arranged linearly on the light-transmitting plate 120. When any one of the pattern areas receives the light 111 from the light source 110, the corresponding floating stereoscopic image is displayed above or at one side of the light-transmitting plate 120. In one example, these floating stereoscopic images may be different stereoscopic images, displaying different image contents respectively. In another example, these floating stereoscopic images may be similar stereoscopic images, but with different states. Through the displacement generated by the light shield 130, these stereoscopic images may be continuously converted, thereby implementing the display of dynamic stereoscopic images.

In other alternative designs, the positions of the light shield 130 and the light source 110 may remain stationary. By generating linear displacement of the light-transmitting plate 120 relative to the light shield 130, the display effect of different stereoscopic images or dynamic stereoscopic images may likewise be implemented.

Figure 4:
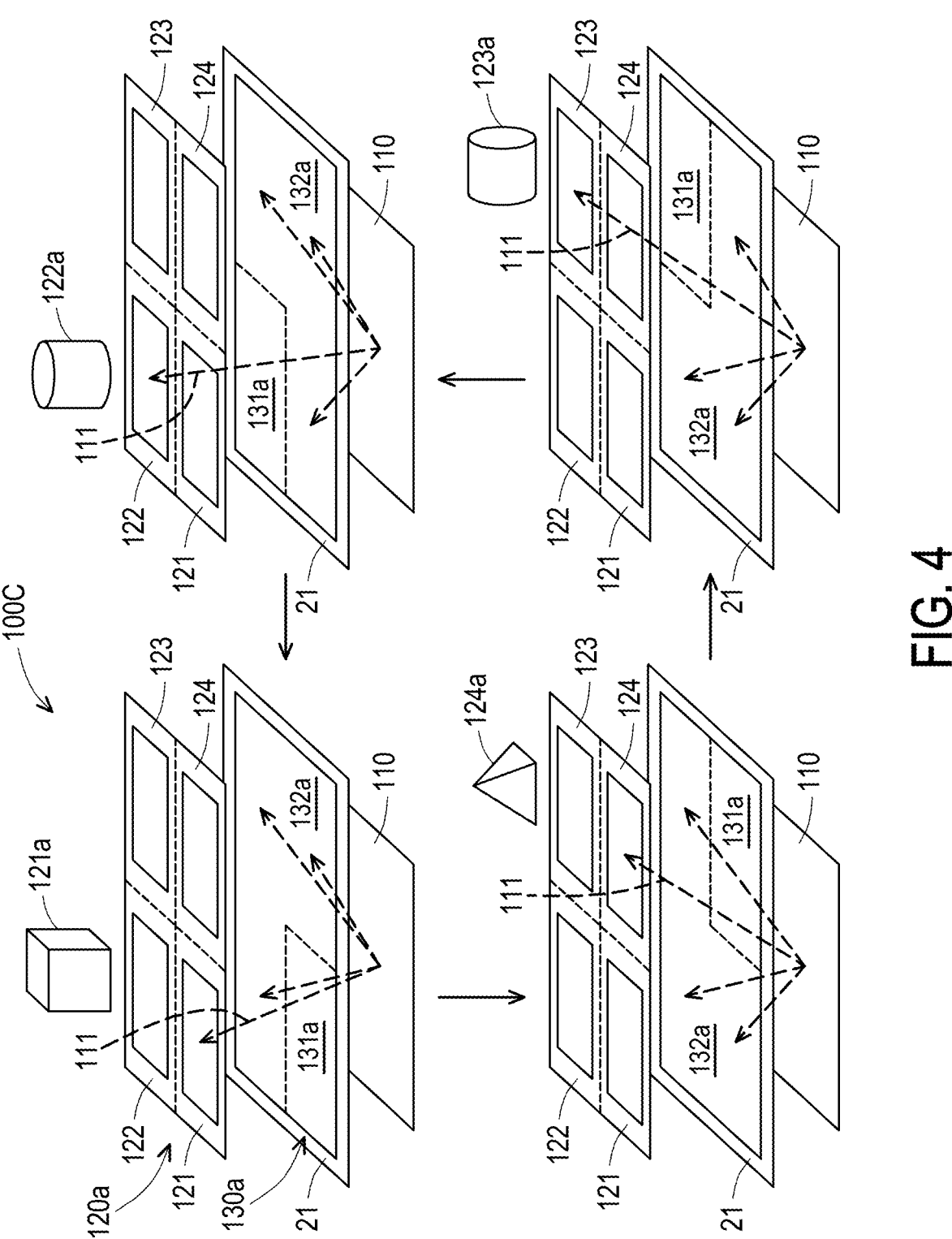
FIG. 4 is a schematic diagram illustrating image conversion of a stereoscopic imaging device according to still another embodiment of the disclosure.

FIG. 4 is a schematic diagram illustrating image conversion of a stereoscopic imaging device according to still another embodiment of the disclosure. Referring to FIG. 4, in this implementation, a stereoscopic imaging device 100C includes a light source 110, a light-transmitting plate 120*a*, a light shield 130*a*, and a control mechanism 21. The light-transmitting plate 120*a* is disposed at one side of the light source 110 and is positioned in the light path of the light 111 emitted by the light source 110. The light-transmitting plate 120*a* may be, for example, an imaging plate, and includes multiple pattern areas, for example: a first pattern area 121, a second pattern area 122, a third pattern area 123, and a fourth pattern area 124.

For example, the first pattern area 121 has image data corresponding to a first floating stereoscopic image 121*a*, and the second pattern area 122 has image data corresponding to a second floating stereoscopic image 122*a*. Additionally, the third pattern area 123 has image data corresponding to a third floating stereoscopic image 123*a*, and the fourth pattern area 124 has image data corresponding to a fourth floating stereoscopic image 124*a*.

In this embodiment, the first pattern area 121, the second pattern area 122, the third pattern area 123, and the fourth pattern area 124 may be arranged in a matrix on the light-transmitting plate 120*a*. Additionally, the light shield 130*a* is disposed between the light source 110 and the light-transmitting plate 120*a*, and is coupled to the control mechanism 21. Relative displacement may be generated among the light shield 130*a*, the light source 110, and the light-transmitting plate 120*a*. For example, the positions of the light-transmitting plate 120*a* and the light source 110 may remain stationary, and the control mechanism 21 controls the light shield 130*a* to generate rotational displacement between the light source 110 and the light-transmitting plate 120*a*, such as rotating around a vertical axis relative to the light source 110 and the light-transmitting plate 120*a*.

Based on the rotation of the light shield 130*a* between the light source 110 and the light-transmitting plate 120*a*, in one state, a part of the light 111 may transmit through the light shield 130, and project onto the first pattern area 121. And, other parts of the light 111 are blocked by the light shield 130, and cannot project onto the second pattern area 122, the third pattern area 123, and the fourth pattern area 124, that is, the light shield 130 blocks the second pattern area 122, the third pattern area 123, and the fourth pattern area 124.

In other states, a part of the light 111 may transmit through the light shield 130, and project onto the fourth pattern area 124. And, other parts of the light 111 are blocked by the light shield 130, and cannot project onto the first pattern area 121, the second pattern area 122, and the third pattern area 123, that is, the light shield 130 blocks the first pattern area 121, the second pattern area 122, and the third pattern area 123. Alternatively, a part of the light 111 may transmit through the light shield 130, and project onto the third pattern area 123. And, other parts of the light 111 are blocked by the light shield 130, and cannot project onto the first pattern area 121, the second pattern area 122, and the fourth pattern area 124, that is, the light shield 130 blocks the first pattern area 121, the second pattern area 122, and the fourth pattern area 124. Or, a part of the light 111 may transmit through the light shield 130, and project onto the second pattern area 122. And, other parts of the light 111 are blocked by the light shield 130, and cannot project onto the first pattern area 121, the third pattern area 123, and the fourth pattern area 124, that is, the light shield 130 blocks the first pattern area 121, the third pattern area 123, and the fourth pattern area 124.

The light shield 130a includes a light-transmitting area 131a and a light-shading area 132a. A part of the light 111 may transmit through the light-transmitting area 131a, and project towards the light-transmitting plate 120a. Additionally, other parts of the light 111 will be blocked by the light-shading area 132a, and cannot project towards the light-transmitting plate 120a. When the light-transmitting area 131a is aligned with the first pattern area 121, the light-shading area 132a is aligned with the second pattern area 122, the third pattern area 123, and the fourth pattern area 124, thereby the first pattern area 121 receives the light 111 from the light source 110, and the light shield 130a blocks the second pattern area 122, the third pattern area 123, and the fourth pattern area 124, thus displaying a first floating stereoscopic image 121a with high resolution above or at one side of the light-transmitting plate 120a.

When the control mechanism 21 controls the light shield 130a to rotate relative to the light source 110 and the light-transmitting plate 120a (for example, rotate 90 degrees counterclockwise) and aligns the light-transmitting area 131a with the fourth pattern area 124, the light-shading area 132a is aligned with the first pattern area 121, the second pattern area 122, and the third pattern area 123, thereby the fourth pattern area 124 receives the light 111 from the light source 110, and the light shield 130a blocks the first pattern area 121, the second pattern area 122, and the third pattern area 123, thus displaying a fourth floating stereoscopic image 124a with high resolution above or at one side of the light-transmitting plate 120a.

When the control mechanism 21 controls the light shield 130a to rotate relative to the light source 110 and the light-transmitting plate 120a (for example, rotate 90 degrees counterclockwise) and aligns the light-transmitting area 131a with the third pattern area 123, the light-shading area 132a is aligned with the first pattern area 121, the second pattern area 122, and the fourth pattern area 124, thereby the third pattern area 123 receives the light 111 from the light source 110, and the light shield 130a blocks the first pattern area 121, the second pattern area 122, and the fourth pattern area 124, thus displaying a third floating stereoscopic image 123a with high resolution above or at one side of the light-transmitting plate 120a.

When the control mechanism 21 controls the light shield 130a to rotate relative to the light source 110 and the light-transmitting plate 120a (for example, rotate 90 degrees counterclockwise) and aligns the light-transmitting area 131a with the second pattern area 122, the light-shading area 132a is aligned with the first pattern area 121, the third pattern area 123, and the fourth pattern area 124, thereby the second pattern area 122 receives the light 111 from the light source 110, and the light shield 130a blocks the first pattern area 121, the third pattern area 123, and the fourth pattern area 124, thus displaying a second floating stereoscopic image 122a with high resolution above or at one side of the light-transmitting plate 120a.

It may be noted that the light shield 130a may rotate clockwise relative to the light source 110 and the light-transmitting plate 120a, to sequentially display the first floating stereoscopic image 121a, the second floating stereoscopic image 122a, the third floating stereoscopic image 123a, and the fourth floating stereoscopic image 124a.

According to the imaging requirements, the control mechanism 21 may flexibly control the light shield 130a to rotate counterclockwise or clockwise, not limited to continuous rotation in a single direction. In addition, the light shield 130a may also adopt a horizontal movement mechanism (for example, moving forward, backward, left, and right) to implement image conversion.

For example, the light-transmitting plate 120a may include four pattern areas arranged in a matrix, multiple pattern areas arranged in a circular manner, or multiple pattern areas arranged in other methods, and the number and arrangement of light-transmitting areas of the light shield 130a may be designed in response to the number and arrangement of pattern areas of the light-transmitting plate 120a. When any one of the pattern areas receives the light 111 from the light source 110, the corresponding floating stereoscopic image is displayed above or at one side of the light-transmitting plate 120a. In one example, these floating stereoscopic images may be different stereoscopic images, displaying different image content respectively. In another example, these floating stereoscopic images may be similar stereoscopic images, but with different states. Through the rotational displacement generated by the light shield 130a, these stereoscopic images may be continuously converted, thereby achieving the display effect of dynamic stereoscopic images.

In other alternative designs, the positions of the light shield 130a and the light source 110 may remain stationary. By generating rotational displacement of the light-transmitting plate 120a relative to the light shield 130a, different stereoscopic images or dynamic stereoscopic images may likewise be displayed.

Figure 5:
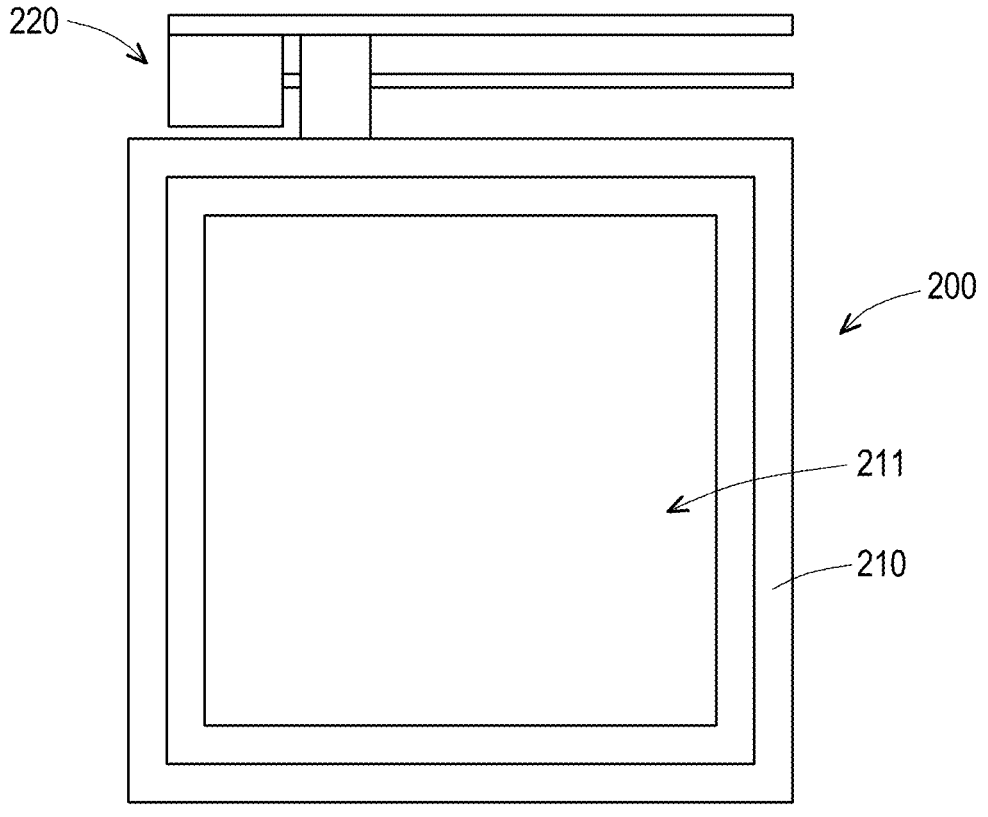
FIG. 5 to FIG. 7 are schematic diagrams of different control mechanisms adopted by the stereoscopic imaging device of the above-mentioned embodiments.
Figure 6:
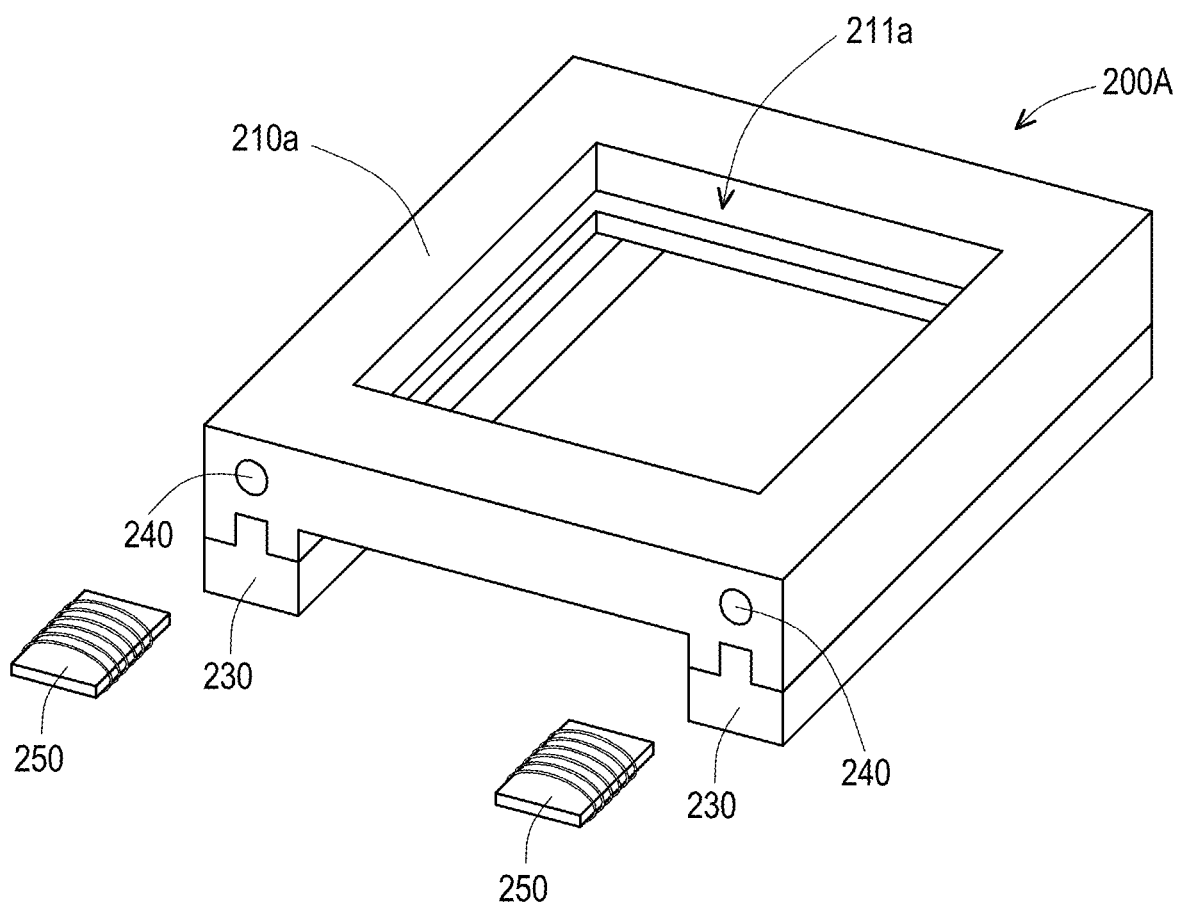
Figure 7:
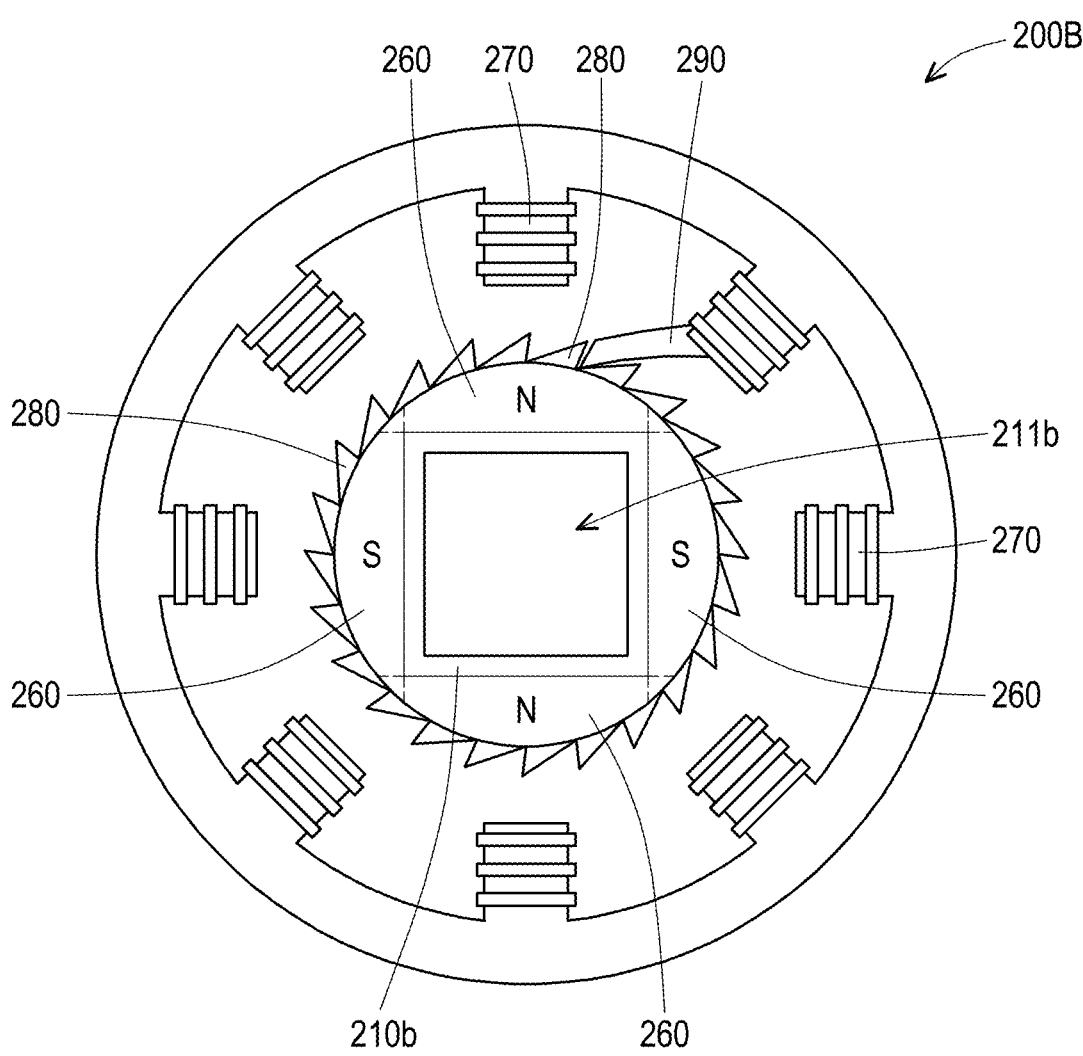

FIG. 5 to FIG. 7 are schematic diagrams of different control mechanisms adopted by the stereoscopic imaging device of the above-mentioned embodiments. In one example, the control mechanism 20 adopted by the stereoscopic imaging device 100 shown in FIG. 1 and the stereoscopic imaging device 100B shown in FIG. 3 may be implemented through a control mechanism 200 shown in FIG. 5. Taking the stereoscopic imaging device 100 shown in FIG. 1 as an example, the light-transmitting plate 120 is coupled to the control mechanism 200, so that the control mechanism 200 controls the linear displacement of the light-transmitting plate 120. Taking the stereoscopic imaging device 100B shown in FIG. 3 as an example, the light shield 130 is coupled to the control mechanism 200, so that the control mechanism 200 controls the displacement of the light shield 130.

The control mechanism 200 may include a carrier 210 and a linear stepper motor 220, wherein the carrier 210 has a light-passing opening 211. The light-transmitting plate 120 shown in FIG. 1 or the light shield 130 shown in FIG. 3 may be disposed within the light-passing opening 211. Additionally, the linear stepper motor 220 is coupled to one side of the carrier 210, and is suitable for driving the carrier 210 to generate linear displacement, thereby allowing the light-transmitting plate 120 or the light shield 130 disposed within the light-passing opening 211 to move with the carrier 210.

In other alternative designs, the positions of the light shield 130 and the light source 110 shown in FIG. 3 may remain stationary, and the light-transmitting plate 120 may be disposed within the light-passing opening 211, thereby allowing the light-transmitting plate 120 disposed within the light-passing opening 211 to move with the carrier 210, to change the position where the light 111 is projected onto the light-transmitting plate 120, thus achieving the display effect of different stereoscopic images or dynamic stereoscopic images.

In one example, the control mechanism 20 adopted by the stereoscopic imaging device 100 shown in FIG. 1 and the stereoscopic imaging device 100B shown in FIG. 3 may be implemented through a control mechanism 200A shown in FIG. 6. Taking the stereoscopic imaging device 100 shown in FIG. 1 as an example, the light-transmitting plate 120 is coupled to the control mechanism 200A, so that the control mechanism 200A controls the displacement of the light-transmitting plate 120. Taking the stereoscopic imaging device 100B shown in FIG. 3 as an example, the light shield 130 is coupled to the control mechanism 200A, so that the control mechanism 200A controls the displacement of the light shield 130.

The control mechanism 200A includes a carrier 210a, a slide rail 230, a magnet 240, and an electromagnet 250, wherein the carrier 210a has a light-passing opening 211a, and the light-transmitting plate 120 shown in FIG. 1 or the light shield 130 shown in FIG. 3 may be disposed within the light-passing opening 211a. The carrier 210a is disposed on the slide rail 230, and the magnet 240 may be disposed on the carrier 210a (for example, disposed corresponding to the side of the carrier 210a).

On the other hand, the electromagnet 250 is disposed on one side of the carrier 210a and aligned with the magnet 240. The electromagnet 250 is suitable for generating magnetic attraction or magnetic repulsion to the magnet 240, to drive the carrier 210a to generate linear displacement on the slide rail 230, thereby allowing the light-transmitting plate 120 or the light shield 130 disposed within the light-passing opening 211a to move with the carrier 210a.

In other alternative designs, the positions of the light shield 130 and the light source 110 shown in FIG. 3 may remain stationary, and the light-transmitting plate 120 may be disposed within the light-passing opening 211a, thereby allowing the light-transmitting plate 120 disposed within the light-passing opening 211a to move with the carrier 210a, to change the position where the light 111 is projected onto the light-transmitting plate 120, thus achieving the display effect of different stereoscopic images or dynamic stereoscopic images.

In one example, the control mechanism 21 adopted by the stereoscopic imaging device 100A shown in FIG. 2 and the stereoscopic imaging device 100C shown in FIG. 4 may be implemented through a control mechanism 200B shown in FIG. 7. Taking the stereoscopic imaging device 100A shown in FIG. 2 as an example, the light-transmitting plate 120a is coupled to the control mechanism 200B, so that the control mechanism 200B controls the displacement of the light-transmitting plate 120a. Taking the stereoscopic imaging device 100C shown in FIG. 4 as an example, the light shield 130a is coupled to the control mechanism 200B, so that the control mechanism 200B controls the displacement of the light shield 130a.

The control mechanism 200B includes a carrier 210b, multiple magnets 260, and multiple electromagnets 270, wherein the carrier 210b has a light-passing opening 211b, and the light-transmitting plate 120a shown in FIG. 2 or the light shield 130a shown in FIG. 4 may be disposed within the light-passing opening 211b. The multiple magnets 260 are disposed on the carrier 210b and surround the light-passing opening 211b.

On the other hand, the multiple electromagnets 270 may be arranged in a circular manner around the carrier 210b, and are suitable for generating magnetic attraction or magnetic repulsion to the multiple magnets 260, to drive the carrier 210b to generate rotational displacement, thereby allowing the light-transmitting plate 120a or the light shield 130a disposed within the light-passing opening 211b to rotate with the carrier 210b.

As shown in FIG. 7, the control mechanism 200B also includes multiple ratchet teeth 280 and a pawl 290, wherein the multiple ratchet teeth 280 may be arranged along the edge of the carrier 210b and surround the light-passing opening 211b. The pawl 290 is disposed on one side of the carrier 210b and may engage with one of the multiple ratchet teeth 280 to prevent the carrier 210b from rotating backwards.

It is particularly noted that, in other examples, the control mechanism 200B may not adopt the design including the ratchet teeth 280 and the pawl 290, allowing the carrier 210b to rotate not only clockwise but also counterclockwise.

In other alternative designs, the positions of the light shield 130a and the light source 110 shown in FIG. 4 may remain stationary, and the light-transmitting plate 120a may be disposed within the light-passing opening 211b, thereby allowing the light-transmitting plate 120a disposed within the light-passing opening 211b to rotate with the carrier 210b, to change the position where the light 111 is projected onto the light-transmitting plate 120a, thus achieving the display effect of different stereoscopic images or dynamic stereoscopic images.

Figure 8:
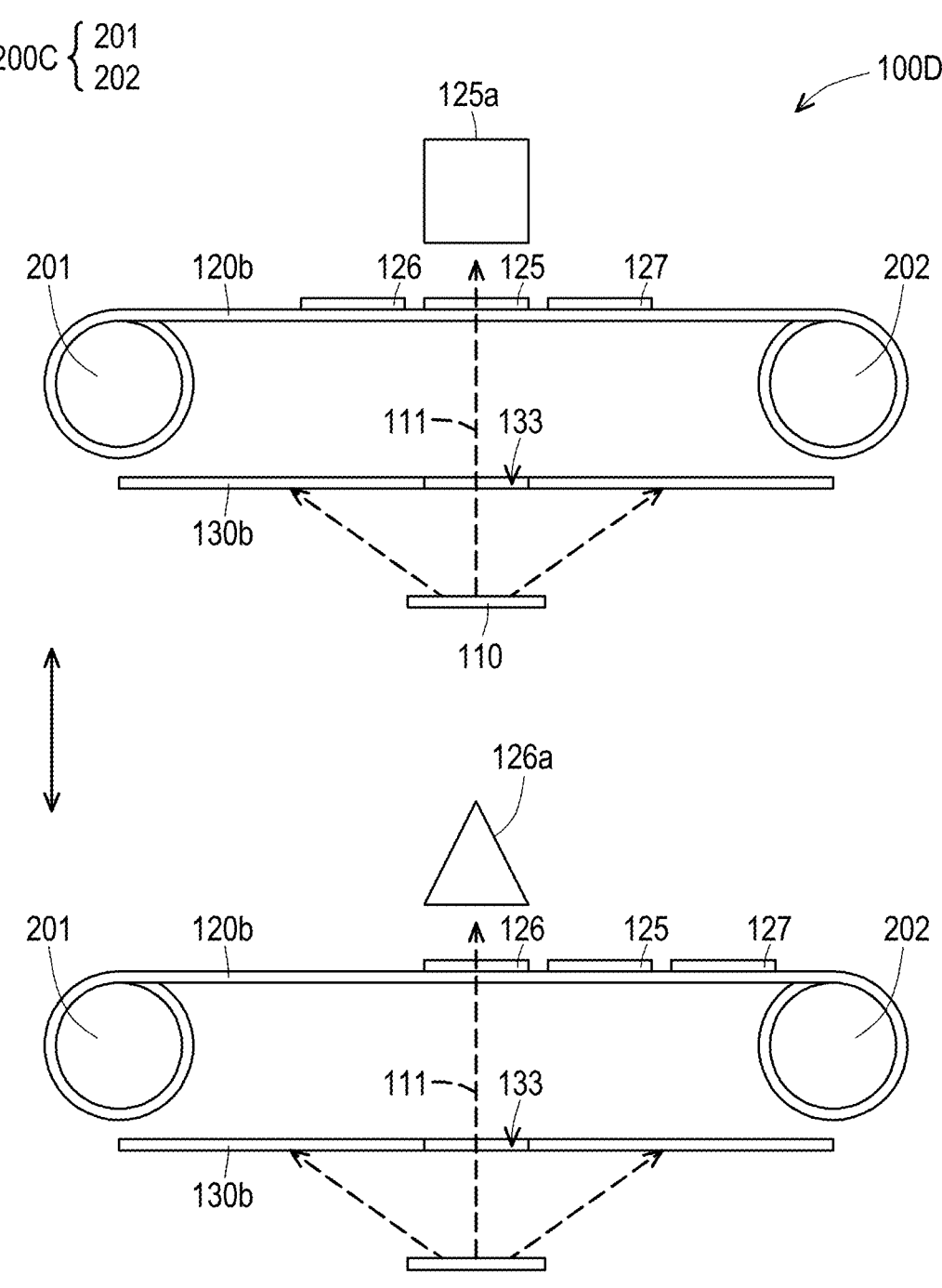
FIG. 8 and FIG. 9 are schematic diagrams illustrating image conversion of stereoscopic imaging devices according to other embodiments of the disclosure.
Figure 9:
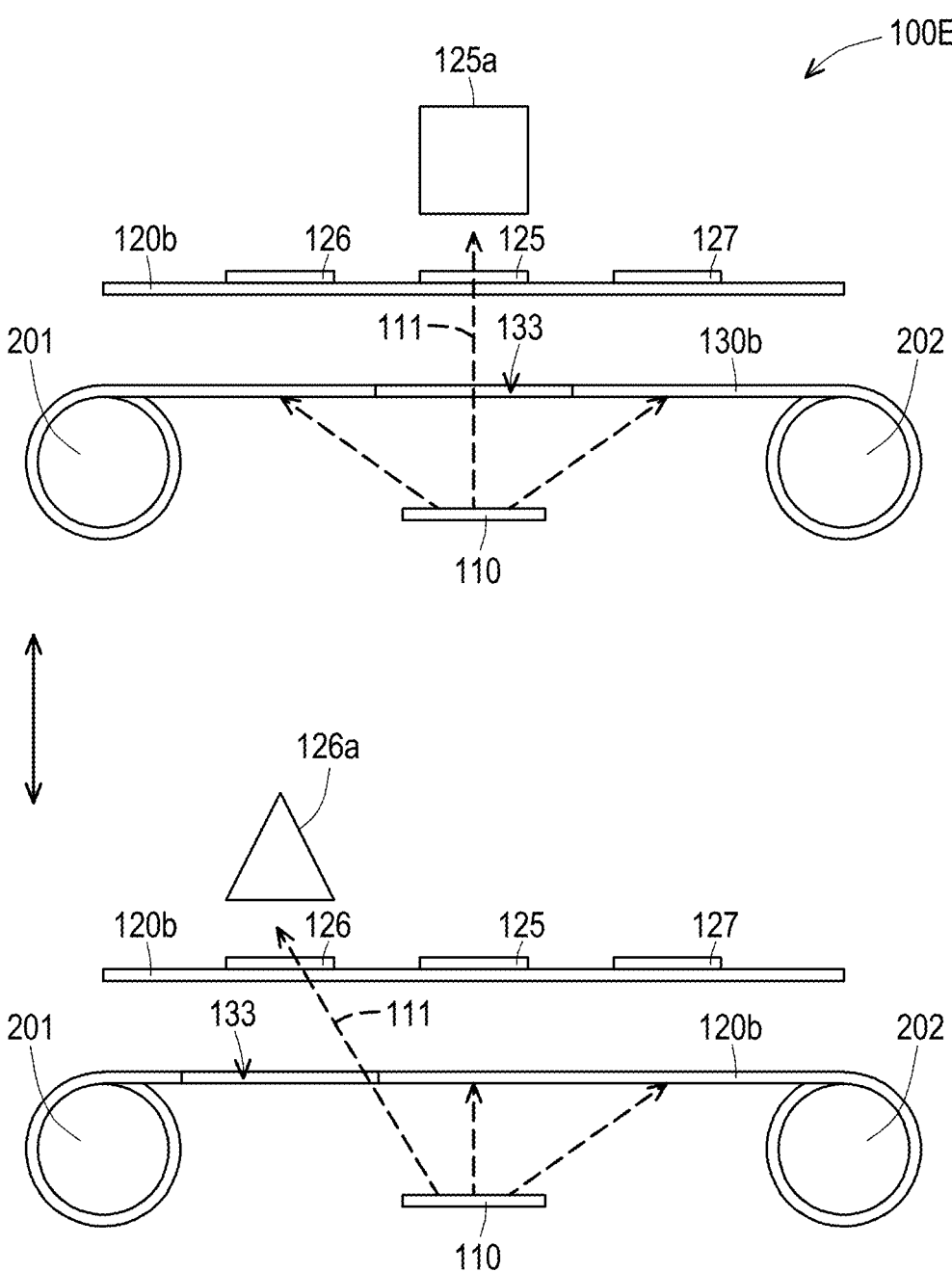

FIG. 8 and FIG. 9 are schematic diagrams illustrating image conversion of stereoscopic imaging devices according to other embodiments of the disclosure. Referring to FIG. 8, in one example, a stereoscopic imaging device 100D includes a light source 110, a light-transmitting plate 120b, a light shield 130b, and a control mechanism 200C. The light-transmitting plate 120b is disposed at one side of the light source 110 and is positioned in the light path of light 111 emitted by the light source 110. The light-transmitting plate 120b may be an imaging plate and includes multiple pattern areas, for example, three pattern areas 125, 126, 127 arranged linearly. Each pattern area has image data corresponding to a predetermined floating stereoscopic image to be displayed.

On the other hand, the light shield 130b is disposed between the light source 110 and the light-transmitting plate 120b, and has a light-transmitting opening 133. The light shield 130b and the light source 110 remain stationary in position, and the light-transmitting plate 120b is coupled to the control mechanism 200C. Furthermore, the control mechanism 200C includes a first roller 201 and a second roller 202 disposed in parallel, wherein the opposite ends of the light-transmitting plate 120b are wound on the first roller 201 and the second roller 202 respectively, and the first roller 201 and the second roller 202 are suitable for driving the light-transmitting plate 120b to generate linear displacement relative to the light shield 130b, to adjust the relative positional relationship between the three pattern areas 125, 126, 127 and the light-transmitting opening 133.

In one state, the light-transmitting opening 133 is aligned with the pattern area 125, while the other two pattern areas 126, 127 are blocked by the light shield 130b. The light 111 emitted from the light source 110 passes through the light-transmitting opening 133 and projects towards the pattern area 125, thereby allowing the pattern area 125 to receive the light 111, thus displaying a high-resolution floating stereoscopic image 125*a* above or at one side of the light-transmitting plate 120*b*.

In another state, the light-transmitting opening 133 is aligned with the pattern area 126, while the other two pattern areas 125, 127 are blocked by the light shield 130*b*. The light 111 emitted from the light source 110 passes through the light-transmitting opening 133 and projects towards the pattern area 126, thereby allowing the pattern area 126 to receive the light 111, thus displaying a high-resolution floating stereoscopic image 126*a* above or at one side of the light-transmitting plate 120*b*.

A stereoscopic imaging device 100E shown in FIG. 9 has a similar design to the stereoscopic imaging device 100D shown in FIG. 8. In the stereoscopic imaging device 100E shown in FIG. 9, the light-transmitting plate 120*b* and the light source 110 remain stationary in position, the opposite ends of the light shield 130*b* are wound on the first roller 201 and the second roller 202 respectively, and the first roller 201 and the second roller 202 are suitable for driving the light shield 130*b* to generate linear displacement relative to the light-transmitting plate 120*b*, to adjust the relative positional relationship between the light-transmitting opening 133 and the three pattern areas 125, 126, 127.

Figure 10:
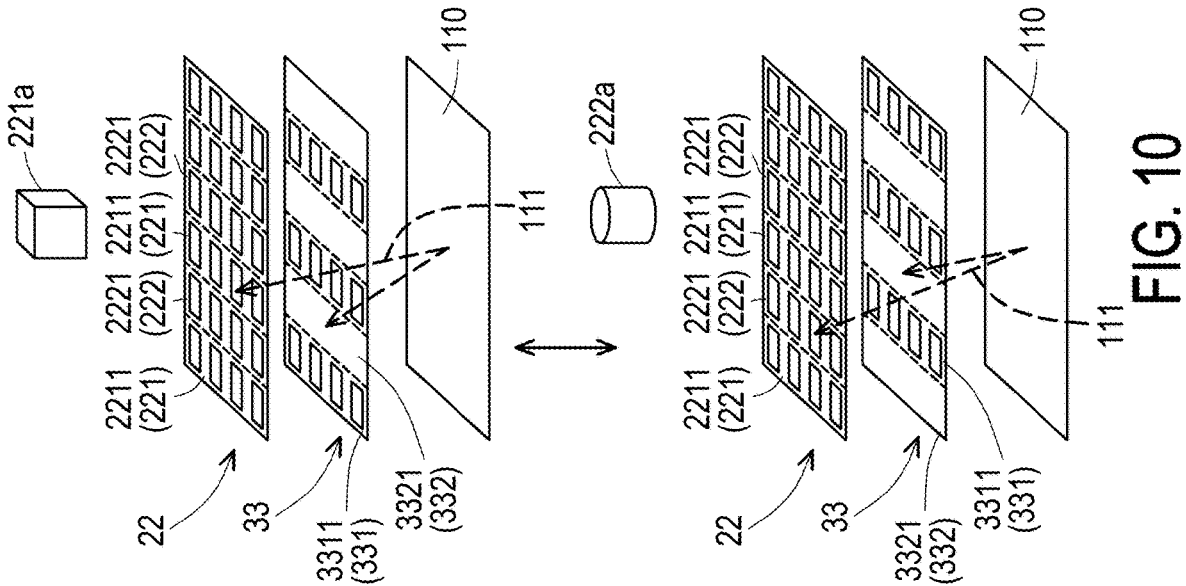
FIG. 10 is a schematic diagram of a combination of a light-transmitting plate and a light shield according to other embodiments of the disclosure.

FIG. 10 is a schematic diagram of a combination of a light-transmitting plate and a light shield according to other embodiments of the disclosure. Referring to FIG. 10, in this embodiment, a first pattern area 221 of a light-transmitting plate 22 may include at least multiple first sub-pattern areas 2211 arranged at intervals, and a second pattern area 222 includes multiple second sub-pattern areas 2221 arranged at intervals. The multiple first sub-pattern areas 2211 and the multiple second sub-pattern areas 2221 are arranged alternately on the light-transmitting plate 22, wherein each first sub-pattern area 2211 has image data corresponding to a first floating stereoscopic image 221*a*, and each second sub-pattern area 2221 has image data corresponding to a second floating stereoscopic image 222*a*.

Correspondingly, a light-transmitting area 331 of a light shield 33 includes multiple sub-light-transmitting areas 3311 arranged at intervals, and a light-shading area 332 includes multiple sub-light-shading areas 3321 arranged at intervals. The multiple sub-light-transmitting areas 3311 and the multiple sub-light-shading areas 3321 are arranged alternately on the light shield 33, and a rotational displacement mechanism may be used to move the light shield 33, to control the alignment of the multiple sub-light-transmitting areas 3311 with the multiple first sub-pattern areas 2211 and the multiple sub-light-shading areas 3321 with the multiple second sub-pattern areas 2221, thereby allowing the first pattern area 221 to receive the light 111 from the light source 110, and the light shield 33 to block the second pattern area 222, thus displaying a high-resolution first floating stereoscopic image 221*a* above or at one side of the light-transmitting plate 22, or, to control the alignment of the multiple sub-light-transmitting areas 3311 with the multiple second sub-pattern areas 2221 and the multiple sub-light-shading areas 3321 with the multiple first sub-pattern areas 2211, thereby allowing the second pattern area 222 to receive the light 111 from the light source 110, and the light shield 33 to block the first pattern area 221, thus displaying a high-resolution second floating stereoscopic image 222*a* above or at one side of the light-transmitting plate 22.

In other examples, the light shield 33 may also use linear displacement or other movement mechanisms to achieve image conversion, or, the light shield 33 may remain stationary, while the light-transmitting plate 22 may use rotational displacement, linear displacement or other movement mechanisms to adjust the alignment relationship between the first pattern area 221 and the second pattern area 222 of the light-transmitting plate 22 relative to the light-transmitting area 331 and the light-shading area 332 of the light shield 33, thereby implementing image conversion.

Figure 11:
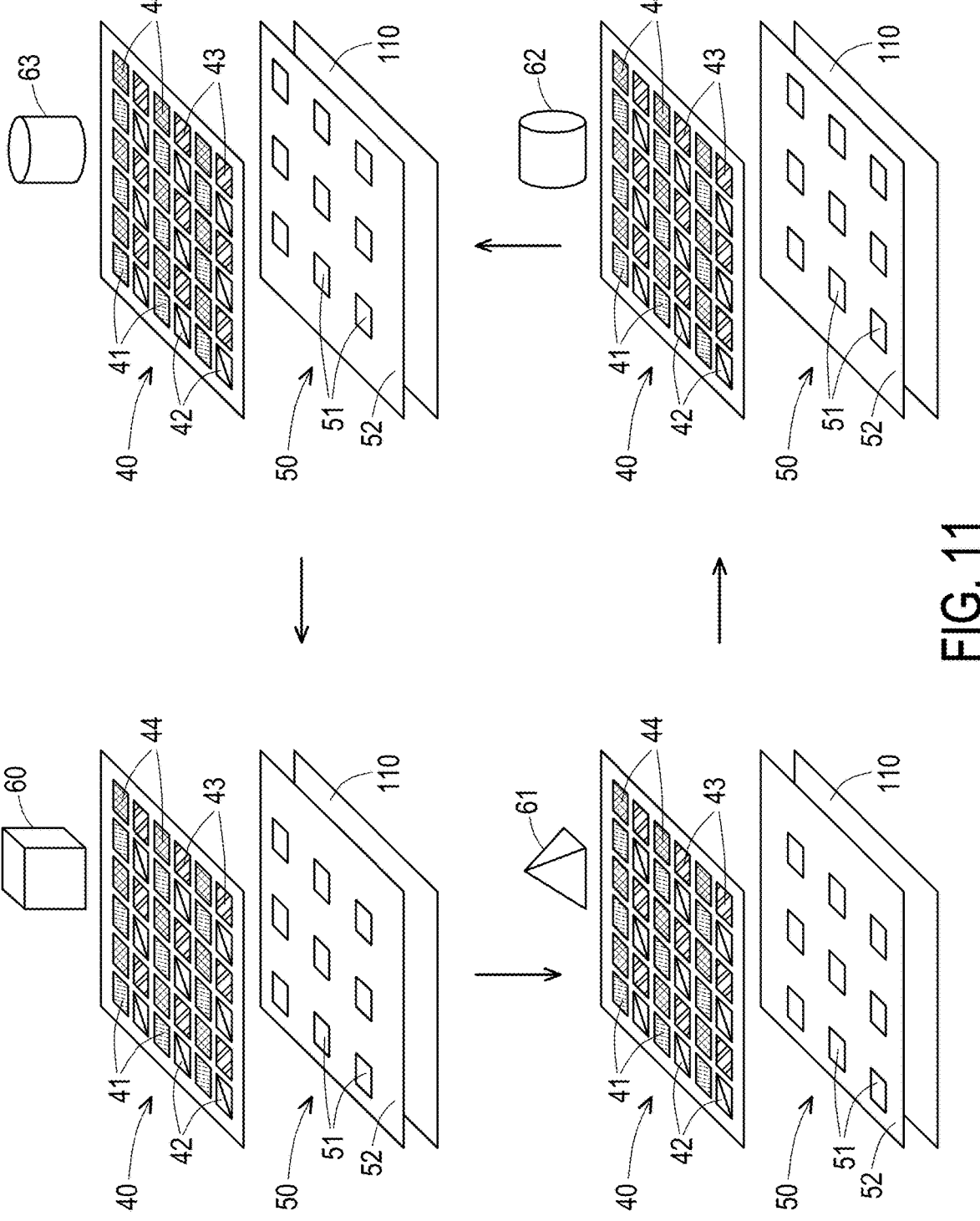
FIG. 11 is a schematic diagram of a combination of a light-transmitting plate and a light shield according to other embodiments of the disclosure.

FIG. 11 is a schematic diagram of a combination of a light-transmitting plate and a light shield according to other embodiments of the disclosure. Referring to FIG. 11, in this embodiment, a light-transmitting plate 40 may include multiple alternately arranged pattern areas, for example: multiple first pattern areas 41, multiple second pattern areas 42, multiple third pattern areas 43, and multiple fourth pattern areas 44. The multiple first pattern areas 41 have image data corresponding to a first floating stereoscopic image 60, and the multiple second pattern areas 42 have image data corresponding to a second floating stereoscopic image 61. Additionally, the multiple third pattern areas 43 have image data corresponding to a third floating stereoscopic image 62, and the multiple fourth pattern areas 44 have image data corresponding to a fourth floating stereoscopic image 63.

Any one first pattern area 41 is not adjacent to other first pattern areas 41, and is surrounded by one or more second pattern areas 42, one or more third pattern areas 43, and/or one or more fourth pattern areas 44. Any one second pattern area 42 is not adjacent to other second pattern areas 42, and is surrounded by one or more first pattern areas 41, one or more third pattern areas 43, and/or one or more fourth pattern areas 44. Any one third pattern area 43 is not adjacent to other third pattern areas 43, and is surrounded by one or more first pattern areas 41, one or more second pattern areas 42, and/or one or more fourth pattern areas 44. Any one fourth pattern area 44 is not adjacent to other fourth pattern areas 44, and is surrounded by one or more first pattern areas 41, one or more second pattern areas 42, and/or one or more third pattern areas 43.

On the other hand, multiple light-transmitting areas 51 on a light shield 50 may be arranged at intervals according to the arrangement pattern of different pattern areas, and surrounded by a light-shading area 52. After each rotation of a preset angle (for example, 90 degrees), the multiple light-transmitting areas 51 are aligned with specific pattern areas, while other pattern areas are blocked by the light-shading area 52, thereby implementing image conversion.

In one implemented state, after rotation, all light-transmitting areas 51 of the light shield 50 are aligned with all first pattern areas 41, while all second pattern areas 42, all third pattern areas 43, and all fourth pattern areas 44 are blocked by the light-shading area 52, thereby allowing all first pattern areas 41 to receive light from the light source 110, thus displaying a high-resolution first floating stereoscopic image 60 above or to one side of the light-transmitting plate 40.

In one implemented state, after rotation, all light-transmitting areas 51 of the light shield 50 are aligned with all second pattern areas 42, while all first pattern areas 41, all third pattern areas 43, and all fourth pattern areas 44 are blocked by the light-shading area 52, thereby allowing all second pattern areas 42 to receive light from the light source 110, thus displaying a high-resolution second floating stereoscopic image 61 above or to one side of the light-transmitting plate 40.

In one implemented state, after rotation, all light-transmitting areas 51 of the light shield 50 are aligned with all third pattern areas 43, while all first pattern areas 41, all second pattern areas 42, and all fourth pattern areas 44 are blocked by the light-shading area 52, thereby allowing all third pattern areas 43 to receive light from the light source 110, thus displaying a high-resolution third floating stereoscopic image 62 above or to one side of the light-transmitting plate 40.

In one implemented state, after rotation, all light-transmitting areas 51 of the light shield 50 are aligned with all fourth pattern areas 44, while all first pattern areas 41, all second pattern areas 42, and all third pattern areas 43 are blocked by the light-shading area 52, thereby allowing all fourth pattern areas 44 to receive light from the light source 110, thus displaying a high-resolution fourth floating stereoscopic image 63 above or to one side of the light-transmitting plate 40.

In summary, in the stereoscopic imaging device disclosed herein, the image data of multiple predetermined floating stereoscopic images to be displayed are divided and formed on the light-transmitting plate to constitute multiple pattern areas. Through linear displacement or rotational displacement generated by the light-transmitting plate, or through displacement generated by the light shield, the light source may project onto different pattern areas, thereby displaying different high-resolution stereoscopic images or dynamic stereoscopic images.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A stereoscopic imaging device, comprising:
a light source;
a control mechanism; and
a light-transmitting plate, coupled to the control mechanism, wherein the light-transmitting plate is disposed at one side of the light source, and at least comprises a first pattern area and a second pattern area, the control mechanism is configured to control the light-transmitting plate to generate displacement, thereby receiving light from the light source through the first pattern area or converting to receive the light from the light source through the second pattern area, thus displaying different stereoscopic images.

2. The stereoscopic imaging device according to claim 1, wherein the control mechanism comprises:
a carrier, having a light-passing opening, and the light-transmitting plate is disposed within the light-passing opening.

3. The stereoscopic imaging device according to claim 2, wherein the control mechanism further comprises:
a linear stepper motor, coupled to one side of the carrier, and suitable for driving the carrier to generate linear displacement.

4. The stereoscopic imaging device according to claim 2, wherein the control mechanism further comprises:
a slide rail, wherein the carrier is slidably disposed on the slide rail;
a magnet, disposed on the carrier; and
an electromagnet, disposed at one side of the carrier, and aligned with the magnet, the electromagnet is suitable for generating magnetic attraction or magnetic repulsion to the magnet, thereby driving the carrier to generate linear displacement on the slide rail.

5. The stereoscopic imaging device according to claim 2, wherein the control mechanism further comprises:

a plurality of magnets, disposed on the carrier, and surrounding the light-passing opening; and
a plurality of electromagnets, circularly arranged around the carrier, and suitable for generating magnetic attraction or magnetic repulsion to the magnets, thereby driving the carrier to generate rotational displacement.

6. The stereoscopic imaging device according to claim 5, wherein the control mechanism further comprises:
a plurality of ratchet teeth, arranged at an edge of the carrier, and surrounding the light-passing opening; and
a pawl, disposed at one side of the carrier, and engaging with one of the ratchet teeth.

7. A stereoscopic imaging device, comprising:
a light source;
a control mechanism;
a light-transmitting plate, disposed at one side of the light source, and comprising at least a first pattern area and a second pattern area; and
a light shield, disposed between the light source and the light-transmitting plate, wherein the light-transmitting plate or the light shield is coupled to the control mechanism, and suitable for generating displacement under control of the control mechanism, to receive light from the light source through the first pattern area and block the second pattern area by the light shield, or convert to receive the light from the light source through the second pattern area and block the first pattern area by the light shield, thereby displaying different stereoscopic images.

8. The stereoscopic imaging device according to claim 7, wherein the control mechanism comprises:
a carrier, having a light-passing opening, and the light-transmitting plate or the light shield is disposed within the light-passing opening.

9. The stereoscopic imaging device according to claim 8, wherein the control mechanism further comprises:
a linear stepper motor, coupled to one side of the carrier, and suitable for driving the carrier to generate linear displacement.

10. The stereoscopic imaging device according to claim 8, wherein the control mechanism further comprises:
a slide rail, wherein the carrier is slidably disposed on the slide rail;
a magnet, disposed on the carrier; and
an electromagnet, disposed at one side of the carrier, and aligned with the magnet, the electromagnet is suitable for generating magnetic attraction or magnetic repulsion to the magnet, thereby driving the carrier to generate linear displacement on the slide rail.

11. The stereoscopic imaging device according to claim 8, wherein the control mechanism further comprises:
a plurality of magnets, disposed on the carrier, and surrounding the light-passing opening; and
a plurality of electromagnets, arranged in a circular manner around the carrier, and suitable for generating magnetic attraction or magnetic repulsion to the magnets, thereby driving the carrier to generate rotational displacement.

12. The stereoscopic imaging device according to claim 11, wherein the control mechanism further comprises:
a plurality of ratchet teeth, arranged at an edge of the carrier, and surrounding the light-passing opening; and
a pawl, disposed at one side of the carrier, and engaging with one of the ratchet teeth.

13. The stereoscopic imaging device according to claim 7, wherein the control mechanism comprises:
a first roller; and a second roller, disposed in parallel with the first roller, wherein opposite ends of the light-transmitting plate are respectively wound on the first roller and the second roller, and the first roller and the second roller are suitable for driving the light-transmitting plate to generate linear displacement relative to the light shield, or, opposite ends of the light shield are respectively wound on the first roller and the second roller, and the first roller and the second roller are suitable for driving the light shield to generate linear displacement relative to the light-transmitting plate.

14. The stereoscopic imaging device according to claim 7, wherein the light shield comprises a light-transmitting area and a light-shading area, and the control mechanism controls the light-transmitting plate or the light shield to generate displacement, to control the light-transmitting area to align with the first pattern area and the light-shading area to align with the second pattern area or control the light-shading area to align with the first pattern area and the light-transmitting area to align with the second pattern area.

* * * * *